UNITED STATES PATENT OFFICE.

JAMES ANDERSON, OF LOUISVILLE, KENTUCKY.

MAKING HYDRAULIC CEMENT.

SPECIFICATION forming part of Letters Patent No. 346,525, dated August 3, 1886.

Application filed March 19, 1886. Serial No. 195,848. (No specimens.)

*To all whom it may concern:*

Be it known that I, JAMES ANDERSON, a citizen of the United States, residing at Louisville, in the county of Jefferson and State of Kentucky, have invented a certain new and useful Improvement in Making Hydraulic Cement; and I do hereby declare that the following is a full, clear, and exact description of the invention, which will enable others skilled in the art to which it appertains to make and use the same.

This my invention relates to a certain new and useful improvement in making or producing hydraulic cement from ordinary cement or lime rock, consisting, first, in reducing the rock to moderately-small pieces, after which immerse the pieces in a solution of acetic acid of moderate strength, and then subject the same to calcination, and when in the lime condition it will represent the common cement of commerce; but if the calcination is continued until a red heat is attained an article known as "Roman cement" will be produced, and if the calcination be continued until the heat becomes white the result will be a cement known in England as "Portland cement;" but, in addition to producing the several grades of hydraulic cement by means of immersing the rock in a solution of acetic acid, as above described, an article of hydraulic cement may be made of air or water slaked lime by the application of the solution of acetic acid, or any other sour substance, when mixed as mortar; or, if necessary, take raw limestone ground into powder and mix it with a solution of acetic acid, sulphate of magnesia, sulphate of iron, or any other sour substance, and it will be converted into a good article of cement, sufficiently durable for building purposes, if formed into blocks.

The object of this my invention is to produce a superior article of hydraulic cement from ordinary cement or lime rock by the application of a solution of acetic acid in connection with moderate calcination, and if further calcined to a red heat an article known as "Roman cement" will be produced, and if still further calcined until a white heat is attained the result will be a cement known in England as "Portland cement."

To carry out my invention, I take ordinary cement rock or limestone and reduce it to moderately-small pieces and immerse them in a solution of acetic acid of moderate strength for about three hours, (more or less,) after which it will cause it to be converted into hydraulic cement, and by calcining until a red heat is attained an article known as "Roman cement" will be produced, and if still further calcined until a white heat is attained an article known in England as "Portland cement" will be produced, which is prepared for use by grinding.

Having fully described my invention, what I desire to claim and secure by Letters Patent is—

The production of hydraulic cement of the several grades described from ordinary cement or limestone rock by immersing it in a solution of acetic acid and afterward calcining it in accordance with the several degrees of heat above described, substantially as herein described, and for the purpose set forth.

JAMES ANDERSON.

Witnesses:
 FRANK PARDON,
 GEORGE HAMMER.